US011707864B2

(12) United States Patent
Bawri (10) Patent No.: US 11,707,864 B2
(45) Date of Patent: Jul. 25, 2023

(54) SYSTEM AND PROCESS FOR PRODUCING DRY MIX CONSTRUCTION MATERIALS WITH IMPROVED ENGINEERING PROPERTIES (71) Applicant: SAROJ VANIJYA PRIVATE LIMITED, Kolkata (IN)

(72) Inventor: Binod Kumar Bawri, Kolkata (IN)

(73) Assignee: SAROJ VANIJYA PRIVATE LIMITED, Kolkata (IN)

( * ) Notice: Subject to any disclaimer, the term of this patent is extended or adjusted under 35 U.S.C. 154(b) by 627 days.

(21) Appl. No.: 16/314,859

(22) PCT Filed: Dec. 28, 2016

(86) PCT No.: PCT/IB2016/058037
§ 371 (c)(1),
(2) Date: Jan. 3, 2019

(87) PCT Pub. No.: WO2018/033784
PCT Pub. Date: Feb. 22, 2018

(65) Prior Publication Data
US 2019/0308343 A1 Oct. 10, 2019

(30) Foreign Application Priority Data
Aug. 17, 2016 (IN) .............................. 201631027942

(51) Int. Cl.
B28C 7/02 (2006.01)
B28C 7/04 (2006.01)
(Continued)

(52) U.S. Cl.
CPC .............. *B28C 7/02* (2013.01); *B28C 7/0481* (2013.01); *G06Q 10/06* (2013.01); *B28C 7/0007* (2013.01); *G06Q 50/08* (2013.01)

(58) Field of Classification Search
CPC ....... B28C 7/02; B28C 7/0481; B28C 7/0007; B28C 5/00; G06Q 10/06; G06Q 50/08
(Continued)

(56) References Cited

U.S. PATENT DOCUMENTS

1,724,403 A * 8/1929 Hutchinson ........... B28C 7/0007
222/77
2,285,765 A * 6/1942 Carswell ............. E01C 19/1068
366/18
(Continued)

*Primary Examiner* — Charles Cooley
(74) *Attorney, Agent, or Firm* — Bochner PLLC; Ariel Reinitz (57) ABSTRACT A system and process for producing a variety of dry mix construction and ancillary construction materials (DMC) with improved structural properties. The system and process employs a material classification unit (204) that classifies at least one of plurality of raw materials (A, B, . . . N) based on their particle size and physical properties. These classified raw materials are stored separately in material handling compartments (260) and are selected according to the construction grade requirements of the end user. The invention further involves the use of a material selection unit (210) which controls the functioning of various components of present invention. The system and process also provides reutilization of industrial waste products like fly ash, blast furnace slag to produce a variety of construction and ancillary construction materials.

16 Claims, 7 Drawing Sheets (51) Int. Cl.
   *B28C 7/00*   (2006.01)
   *G06Q 10/06*  (2023.01)
   *G06Q 50/08*  (2012.01)

(58) Field of Classification Search
   USPC .................................................. 366/16–21
   See application file for complete search history.

(56) References Cited

U.S. PATENT DOCUMENTS

| | | | | |
|---|---|---|---|---|
| 2,893,602 A * | 7/1959 | Heacock | ................ | B01F 7/042 |
| | | | | 222/77 |
| 3,170,677 A * | 2/1965 | Phister, Jr. | ............ | B28C 7/0007 |
| | | | | 366/16 |
| 3,625,488 A * | 12/1971 | Farnham | ............ | E01C 19/1068 |
| | | | | 366/18 |
| 3,661,365 A * | 5/1972 | Cloud, Jr. | ............ | B28C 7/0023 |
| | | | | 366/18 |
| 3,741,532 A * | 6/1973 | Farnham | ............ | E01C 19/1068 |
| | | | | 366/7 |
| 4,538,221 A * | 8/1985 | Crain | ................ | G05D 11/139 |
| | | | | 137/101.19 |
| 4,538,222 A * | 8/1985 | Crain | ................ | G05D 11/139 |
| | | | | 137/101.19 |
| 4,579,458 A * | 4/1986 | Ohlson | ................ | C04B 26/26 |
| | | | | 366/17 |
| 4,802,139 A * | 1/1989 | Sasaki | ................ | E01C 19/1004 |
| | | | | 209/11 |
| 4,850,750 A * | 7/1989 | Cogbill | ............... | B01F 13/0035 |
| | | | | 406/82 |
| 5,176,445 A * | 1/1993 | Mize | ........................ | B09C 1/06 |
| | | | | 110/236 |
| 6,042,259 A * | 3/2000 | Hines | ..................... | B28C 7/024 |
| | | | | 366/17 |
| 10,080,987 B1 * | 9/2018 | Crawford | .............. | F26B 11/028 |
| 2008/0273415 A1 * | 11/2008 | Thornton | ................ | B28C 9/002 |
| | | | | 366/8 |
| 2014/0355372 A1 * | 12/2014 | Black | ................. | B01F 15/0445 |
| | | | | 366/8 |
| 2017/0314211 A1 * | 11/2017 | Mehta | ..................... | C04B 26/26 |

* cited by examiner

| Raw Material<br><br>Particle Size | Fine Aggregate (Sand/Crushed Sand/Slag Sand Etc) | Fly Ash | GGBS |
|---|---|---|---|
| As a Fine Aggregate Replacement | 0 to75 mic + 75 mic to 600 mic + 600 mic to 2.36 mm + 2.36 mm to 4.75 mm | 0 to 150 mic | 0 to 150 mic |
| As a Normal Pozzolana (Similar to Conventional Fly ash/GGBS) | N/A | Blaines fineness of 3200 to 4000 | Blaines fineness of 3200 to 4000 |
| As a Super Classified Pozzolana | N/A | Blaines fineness of 5000 and above | Blaines fineness of 5000 and above |
| As a Hyper Pozzolana similar to Alccofine (finely grounded GGBS) | N/A | Blaines fineness of 80000 to 120000 | Blaines fineness of 80000 to 120000 |
| As a Hyper Pozzolana similar to Microsilica | N/A | Blaines fineness of 150000 to 250000 | Blaines fineness of 150000 to 250000 |
| As a Mineral Admixture | N/A | Blaines fineness of 2000 to 3200 cm2/gm | Blaines fineness of 2000 to 3200 cm2/gm |
| As Fillers in Blockwork/Plaster | 0 to75 mic + 75 mic to 600 mic + 600 mic to 2.36 mm + 2.36 mm to 4.75 mm | 0 to 150 mic | 0 to 150 mic |

Fig. 4

| Desired Final Dry Mix Ratio/Percentage of each material | Plaster Mix | For PCC (Plain Cement Concrete - M10 to M15) | For RCC - M20 to M60 | For Self Compacting Concrete - All grades | For Pavement (Road) Concrete | For Other special Concretes | Block Work (Approximate Ratios) |
|---|---|---|---|---|---|---|---|
| Cement | 400-600 gms | 130 to 150 kgs | 175 to 370 kgs | 150 to 280 kgs | 250 to 300 kgs | Custom Designed | 1 |
| As a Fine Aggregate Replacement | 600 to 800 gms | 800 to 1200 | 700 to 1100 | 1000 to 1400 | 600 to 1000 | Custom Designed | 4 to 10 |
| As a Normal Pozzolana (Similar to Conventional Fly ash/GGBS) | 200 to 300 gms | 130 to 150 kgs | 125 to 175 kgs | 120 to 250 kgs | 120 to 180 kgs | Custom Designed | 1 |
| As a Super Classified Pozzolana | N/a | N/a | 50 to 150 kgs | 50 to 150 kgs | 30 to 70 kgs | Custom Designed | 0.25 to 0.50 |
| As a Hyper Pozzolana similar to Alccofine (finely grounded GGBS) | N/a | N/a | 10 to 50 kgs | 10 to 40 kgs | 10 to 20 kgs | Custom Designed | N/a |
| As a Hyper Pozzolana similar to Microsilica | N/a | N/a | 10 to 25 kgs | 10 to 25 kgs | Traces if Required for high grade PQC | Custom Designed | N/a |
| As a Mineral Admixture | included in fine aggregate replacement | 0.5 to 1% by weight of cementitious mat | 0.5 to 1% by weight of cementitious mat | 0.5 to 1% by weight of cementitious mat | 0.5 to 1% by weight of cementitious mat | Custom Designed | N/a |
| As Fillers in Blockwork/Plaster | N/a | N/a | N/a | N/a | N/a | Custom Designed | 1 to 3 |

SYSTEM AND PROCESS FOR PRODUCING DRY MIX CONSTRUCTION MATERIALS WITH IMPROVED ENGINEERING PROPERTIES

FIELD OF THE DISCLOSURE

The invention relates to a system and process for producing a variety of dry mix construction (DMC) materials as per the construction material grade requirements of end users. Specifically, the present invention provides a system and process which utilizes various industrial waste materials along with the traditionally used construction raw materials to produce various grades of dry mixed construction materials. More specifically, the present system and process solves end user problems such as construction grade selection for a specific structure construction, estimating water requirement for a specific structure construction, and easing the transportation and storage of raw materials required for a particular structure constriction.

BACKGROUND OF THE DISCLOSURE

Around the globe, there are various types of construction materials used in infrastructure development such as concrete, plaster, reinforced sawdust materials, iron, steel, glass, and/or wood. These construction materials are the most basic ingredients of any infrastructure development project. Further, the said construction and ancillary construction materials such as concrete, plaster, cement reinforced sawdust materials are highly versatile in nature i.e. malleable when newly mixed, yet strong when hardened. This versatile nature facilitates their use in building houses, skyscrapers, highways, bridges and other similar infrastructure construction projects.

To understand the versatile nature of the concrete, plaster, it is also important to understand the hydration process of a concrete material. In the hydration process, the concrete and plaster material gets physical change from a dry mixture material into a solid structure mass. This change in the physical property of the concrete material occurs due to the chemical reaction between cementitious materials and water. The hydration process does not only solidify the dry concrete and plaster materials into a solid structure mass but the said process is irreversible. Therefore, it is very important as to when water is mixed with said concrete and plaster materials.

Until the second half of the 20$^{th}$ century, Site Mixed Concrete (SMC) has been the major and only mode of facilitating the infrastructure development around the globe. Eventually, it was found that the traditionally followed methods of site mixing of concrete could no longer cater to the massive requirement for production and execution of concrete related works in the present socio-economic conditions. Also, the emergence of multistory buildings and the requirement for fast track constructions and higher quality norms made it impossible for employing site mixed construction materials to cater to the same.

Later, another concept called Ready Mixed Concrete (RMC) emerged as an effective solution to fill up all the bottlenecks mentioned as above, where it could be claimed that some of the problems faced by the customers were solved, but a complete one-stop solution could still not be provided to all categories of customers. RMC proved much advantageous over the traditional site mixed concrete as far as quantity of concrete required at site was concerned, but it still had flaws in the operational perspective like the deterioration in quality of concrete in case of delay of RMC at site. Also, the RMC employs use of transport (truck) which is a transit mixer that collects the RMC from the plants and carries it all the way to site. This way is also a lot costlier.

This led to the concept of Dry Mix Concrete (DMC) which allowed the user to use the concrete, and/or plaster mix after adding a certain amount of water thereto. However, the quality of concrete, and/or plaster to be utilized differs for different construction requirements such as floor, roof, pillars, and walls etc., thus the existing DMC cannot be used for all purposes due to unavailability of different grades of concrete for different jobs.

In order to solve the existing problems, a system is needed that can help solve problems such as "quantity of concrete and/or plaster" for SMC, "quality and cost issues of concrete and/or plaster" for RMC, and "grade-wise quantity and quality of concrete and/or plaster" for DMC. That is, a DMC product that is manufactured keeping in mind the specific structure construction requirements as well as the user requirements, along with means to provide DMC in sufficient amount.

Since, the concrete is most consumed construction material which requires raw materials extracted from natural resources such as coarse gravel or crushed rocks, limestones, granite, fine particles such as sand. Therefore, the extraction of raw materials to produce concrete adversely affects the environment.

On the other hand there are existing concrete manufacturing processes which propose utilization of waste products from various industries as raw materials to produce concrete and/or plaster materials. But the concrete and/or plaster materials thus produced do not always fulfil all the requirements of end users and thus fails in this regard. Moreover, such concrete and/or plaster materials as produced from the industrial waste materials require lot of knowledge with regard to the chemical and physical properties of the waste materials. Accordingly, a common laymen person is not always able to produce the desired concrete and/or plaster materials by utilizing various industrial waste materials.

Moreover, it is always desirable to reutilize various industrial waste materials to overcome the environment pollution as caused by high discharge of such industrial wastes. Accordingly, there is a demand for the reutilization of such industrial wastes in a useful manner like production of various different kinds of construction materials such as concrete, plaster, reinforced sawdust materials, and/or ancillary construction materials.

Hence, there is also a need of a system and process which can employ various waste materials as the starting raw materials in production of various construction materials. Further, there is also a need for a system and process which is user friendly, environment friendly and also helps in protecting the natural resources by reducing the burden of mining for various types of construction materials.

Therefore, a system and process is required that produces various different grades of most useful construction materials such as dry mix concrete, plaster and/or ancillary construction materials by using various industrial waste materials.

SUMMARY

Aspects of the invention are thus directed to a system and process for producing a Dry Mix Construction material (DMC) such as dry mix concrete and/or plaster having structural properties as per the construction requirements of the end user. Further, the said DMC is prepared by utilizing industrial wastes, making the DMC environmental friendly as well as providing DMC as per the grade desired by user.

In light of the various problems disclosed regarding the existing systems and methods for producing such construction materials, present invention proposes a solution which not only produces dry mix construction material based on the user requirements, with improved structural properties, but also employs the use of various industrial waste materials. These waste materials are classified based on their particle size before producing different grades of dry mix construction material such as dry mix concrete and/or plaster. Thus, overcoming the problems of existing systems and methods.

In an aspect of the present invention, a system for producing dry mix construction materials such as dry mix concrete and/or plaster with improved structural properties is disclosed. The said system has a plurality of raw material storage compartments adapted for storing different raw materials (A, B, ... N) from different sources. Further, a material classification unit that segregates or classifies different raw materials into a plurality of material sub-classes $(A_1, A_2, A_3, \ldots A_n; B_1, B_2, B_3, \ldots B_n; N_1, N_2, N_3, \ldots N_n)$. The process of classification is based on criteria including but not limited to, grade, particle size, physical state, source of raw material etc. In another aspect of the present invention, the shape of certain raw materials (A, B, ... N) is improved via the said process of classification and thus the said invention provides a construction material with improved engineering properties.

In an embodiment, the said material classification unit includes but not limited to a sieving unit, a vibratory/rotary ball mill, an air classification system such as a cyclonic separator, and the like. In another embodiment, the material sub-classes $(A_1, A_2, A_3, \ldots A_n; B_1, B_2, B_3, \ldots B_n; N_1, N_2, N_3, \ldots N_n)$ obtained after classification are stored in different material handling compartments.

In an aspect, a chemical dispersion unit that has various chemical materials $(CM_1, CM_2, CM_3, \ldots CM_n)$ stored in different chemical storage units $(CS_1, CS_2, CS_3, \ldots CS_n)$ is employed to add such chemical materials $(CM_1, CM_2, CM_3, \ldots CM_n)$ to the said Dry Mix Construction material (DMC). In an embodiment, the amount chemical material added depends on the grade of construction material as desired by the user.

In another aspect of the present invention, a material selection unit works conjunction with the material handling compartments, raw material storage compartments, and the chemical storage units (CS1, CS2, CS3, ... CSn). The material 10 selection unit has a control panel for selecting the type of construction material to be produced either depending on user requirements or automatically, and a command panel for controlling the operation of producing the DMC materials.

In an embodiment, the command panel of the material selection unit controls the operation by controlling the amount of raw materials (A, B, ... N), chemical materials $(CM_1, CM_2, CM_3, \ldots CM_n)$ etc. to be used in producing the said DMC materials.

In an embodiment, the material selection unit controls different components that help in producing the said DMC materials.

In another embodiment, the process utilizes commands generated by a material selection unit which controls the process of producing dry mix construction (DMC) materials. The said commands are different based on type of construction material to be produced and thus the ingredients or raw materials (A, B, ... N) involved in the process are varied accordingly.

In an aspect, the commands as generated are adapted to control the flow of raw materials (A, B, ... N) i.e. amount of raw materials (A, B, ... N) utilized is controlled by the commands generated by the material selection unit.

In another aspect, the process of producing dry mix construction materials involves using at least one of the chemical materials $(CM_1, CM_2, CM_3, \ldots CM_n)$ from the chemical dispersion unit that is blended along with at least one of the plurality of material sub-classes $(A_1, A_2, A_3, \ldots A_n; B_1, B_2, B_3, \ldots B_n; N_1, N_2, N_3, \ldots N_n)$ and at least one of the raw materials (A, B, ... N) in a blending unit.

In an embodiment, the present process of producing dry mix construction material transfers the produced dry mix construction material from the blending unit to a silo. The transport of the raw materials (A, B, ... N), chemical materials $(CM_1, CM_2, CM_3, \ldots CM_n)$, dry mix construction material etc. is facilitated by the conveyor.

Therefore, the present invention provides a system and process for producing dry mix construction (DMC) materials such as dry mix concrete, plaster and/or ancillary construction materials with improved structural properties and of different grades depending on the user requirements.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

DESCRIPTION OF THE DRAWINGS

The advantages and features of the present invention will become better understood with reference to the following detailed description taken in conjunction with the accompanying drawings, in which.

Like reference numerals refer to like parts throughout the description of several views of the drawing.

DESCRIPTION OF THE INVENTION

The exemplary embodiments described herein detail for illustrative purposes are subjected to many variations. It should be emphasized, however, that the present invention is not limited to a system for producing DMC. It is understood that various omissions and substitutions of equivalents are contemplated as circumstances may suggest or render expedient, but these are intended to cover the application or implementation without departing from the spirit or scope of the present invention.

Unless otherwise specified, the terms, which are used in the specification and claims, have the meanings commonly used in the field of construction and/or construction material production process and machines involved therein. Specifically, the following terms have the meanings indicated below.

The terms "a" and "an" herein do not denote a limitation of quantity, but rather denote the presence of at least one of the referenced item.

The terms "having", "comprising", "including", and variations thereof signify the presence of a component.

The term "ash" or "fly ash" refers here to coal combustion products that are generated as industrial wastes in coal-fired thermal power stations.

The terms "Site Mix Construction", "Ready Mix Construction" and "Dry Mix Construction" are interchangeably referred to hereinafter as "SMC", "RMC" and "DMC" respectively.

The term "dry mix construction materials" refers here to the construction materials used for various construction purposes such as construction for building structure construction, construction for road and runway pavement, construction for building dams and flyovers, and/or construction for building underground and underwater structures and includes materials such as dry mix concrete, plaster and/or reinforced saw dust materials.

The term "ancillary construction materials" refers here to the plaster materials, repairing cement admixture, and/or reinforced cement admixtures.

The term "additive(s)" refers to synthetic or natural occurring materials or compounds or agents which are capable of improving the physical and chemical properties of the dry mix construction and ancillary construction materials.

It should be noted that the term "pozzolanic activity" as referenced hereinbelow means capability of binding calcium hydroxide in the presence of water as understood in the art.

The industrial waste referred to herein include but not limited to the industrial wastes from thermal power plants or cool burning units, mining industry, blast furnace slag.

Figure 1:
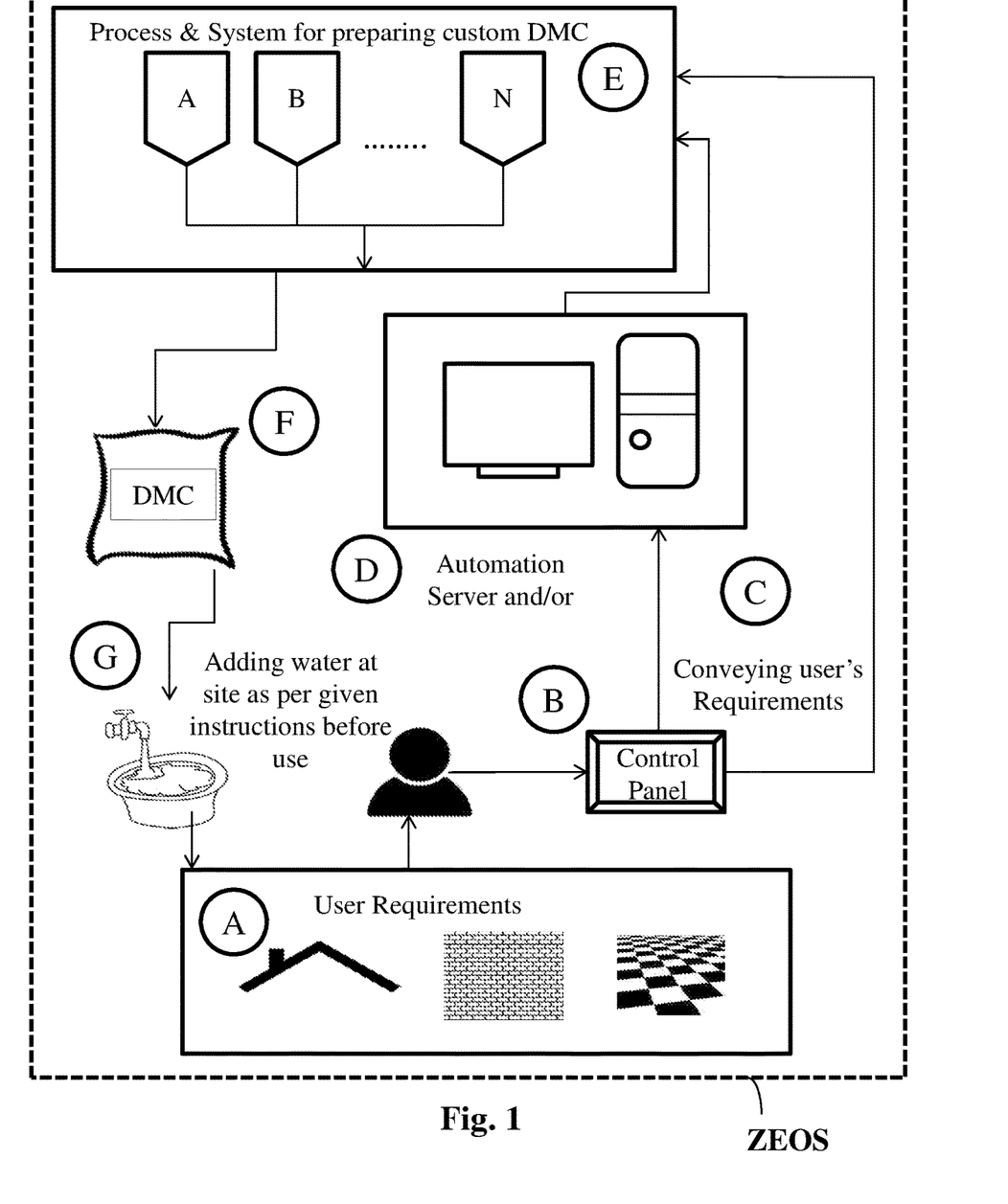
FIG. 1 illustrates an exemplary environment involving the system for producing DMC along with implementation at user's end, according to various embodiments of the present invention.

FIG. 1 illustrates an exemplary block diagram of a zero error operating system (ZEOS) for producing dry mix construction and ancillary construction materials (hereinafter collectively referred to as "DMC") as per the demand and requirements of the end customer. As illustrated in FIG. 1, initially the user's requirements with regard to a specific construction material are determined as represented by step (A). The user's requirements with regard to a specific construction material includes construction specification data such as but not limited to construction strength, construction usage environment like hot/cold and/or water/territorial, surface finish, and/or construction setting period.

Thereafter, at step (B) the user provides his input in relation to the construction material demand and/or a specific structure construction requirement to the control panel via a user interface. Specifically at step (C), the said user requirements of the construction material are directly inputted by the user itself or by a professional who is operating the present system for producing the DMC. The said inputs can be provided as the required construction specification data or the required composition of the construction and/or ancillary construction materials.

In case, if the user provides inputs for the construction specification data to the control panel then the said data is transferred to the automation server (D). In an embodiment, the user requirements for producing DMC are determined 30 by the said automation server (D) by analyzing the construction specification data and calculating the various physical and chemical construction criteria as required for the end use. In such a situation, the said automation server (D) and the said plurality of system components (E) are adapted for preparing the dry mix construction. Wherein, the said automation server (D) generates a plurality of commands as per the construction specification data provided by the user. The said plurality of commands is then transmitted to the said plurality of system components. The said plurality of system components are adapted to work in conjunction with each other to provide a perfect dry mix construction composition as required by the end user.

In case, if the user provides inputs for the required composition of the construction and/or ancillary construction materials then such information is directly passed to the plurality of system components (E) for preparing custom DMC. The said plurality of system components (E) then provides a perfect dry mix construction composition as required by the end user.

In an embodiment, the said plurality of system components (E) includes plurality of raw material storage compartments, a material classification unit, a chemical dispersion unit, a material selection unit, a blending unit, and a plurality of conveyer belts/alternate dispersion systems. The material classification unit is adapted to classify at least one of the said plurality of raw materials (A, B, . . . N) into a plurality of material sub-classes ($A_1, A_2, A_3, \ldots A_n$; $B_1, B_2, B_3, \ldots B_n$; $N_1, N_2, N_3, \ldots N_e$). Further, the said plurality of material sub-classes ($A_1, A_2, A_3, \ldots A_n$; $B_1, B_2, B_3, \ldots B_n$; $N_1, N_2, N_3, \ldots N_n$) is stored in a plurality of material handling compartments. The chemical dispersion unit includes a plurality of chemical materials ($CM_1, CM_2, CM_3, \ldots CM_n$) stored in a plurality of chemical storage units ($CS_1, CS_2, CS_3, \ldots CS_n$). The said plurality of conveyer belts are adapted to connect the said plurality of material handling compartments, the said raw material storage compartments and the said plurality of chemical storage units ($CS_1, CS_2, CS_3, \ldots CS_n$) with the said blending unit.

Further, the said plurality of material handling compartments, the said raw material storage compartments and the said plurality of chemical storage units ($CS_1, CS_2, CS_3, \ldots CS_n$), are configured to discharge a plurality of droppings of fine construction aggregate, course construction aggregate, cement, chemical materials ($CM_1, CM_2, CM_3, \ldots CM_n$), and/or specially classified materials obtained from various industrial wastes. Such plurality of droppings are then carried by the plurality of conveyer belts/alternate dispersion systems and blended into the dry mix blend via the blending unit.

In an embodiment the said dry mix blend contains cement for imparting hardening property, fine aggregates from sand material as a filer, fly ash and blast furnace slag for imparting pozzolanic activity and/or chemical materials ($CM_1$, $CM_2$, $CM_3$, ... $CM_n$) for initial binding. Further, the said dry mix blend is suitable to be used as a dry mix construction ancillary product such as a dry mix plaster product (DMP). If the customer requires the said dry mix plaster then the said dry mix blend is packed as it is in the air tight bags and transported to the user. Finally, the said dry mix construction is mixed after ensuring the datum level of moisture and packed into air and water proof bags (F). Further, the present system provides a closed environment for producing a desired construction material, wherein the said closed environment provides a moisture free construction material and thus the overall system become zero error operating system (ZEOS). Such process provides a long lasting dry mix construction which have improved structural properties as well as which is easy for storage and transportation.

In an embodiment, the DMC produced and packed in bags (F) is utilized at the site after mixing it with particular amount of water as mentioned on the packaging bags (F). Finally, the said zero error operating system (ZEOS) provides a dry mix construction material as per the demand and requirements of the end customer or the construction specification data of a specific construction structure.

Figure 2:
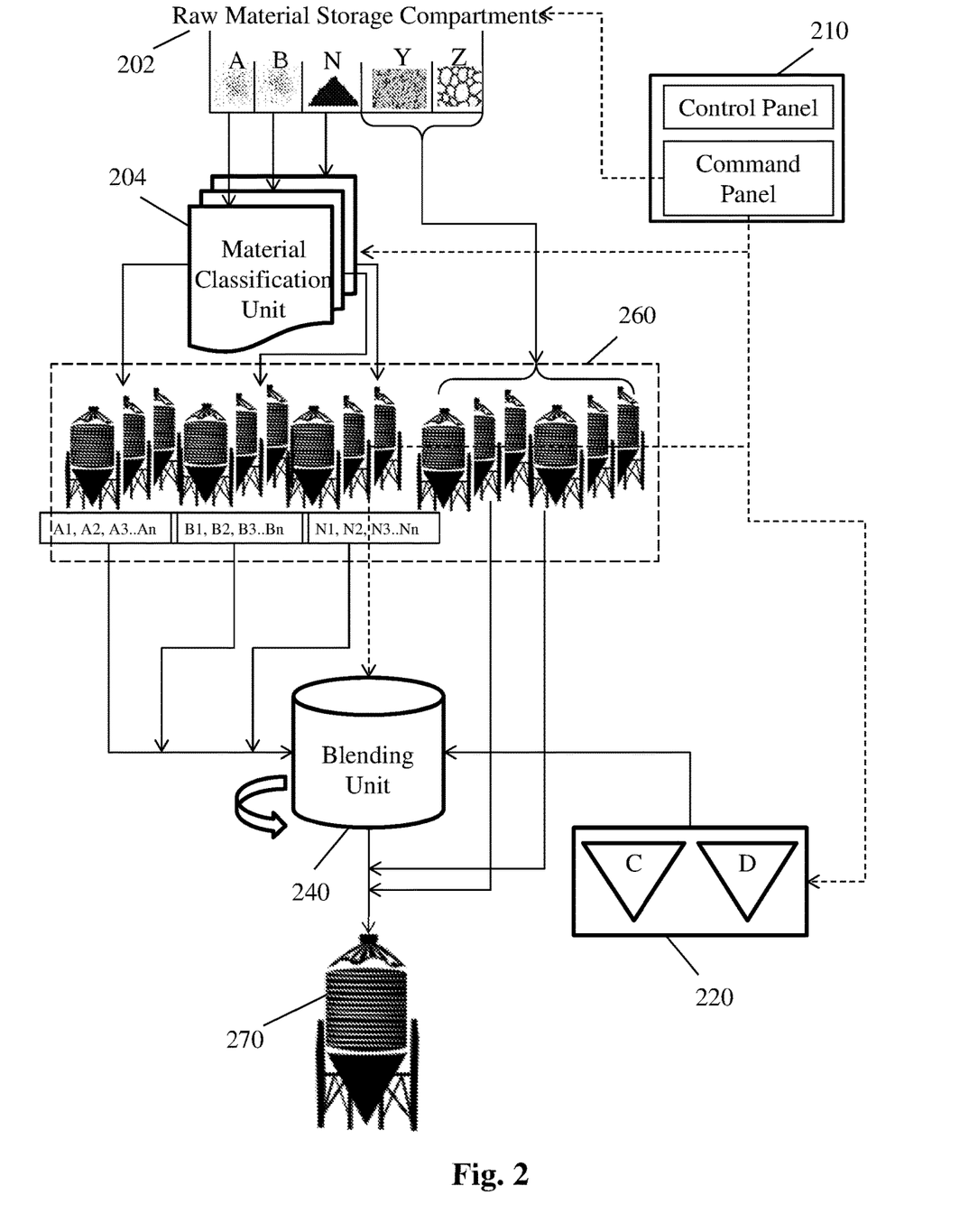
FIG. 2 illustrates an exemplary block diagram involving various components for producing DMC with improved structural properties, according to various embodiments of the present invention.

In a specific embodiment, the FIG. 2 illustrates the various system components adapted for producing a dry mix construction with improved engineering properties. The said system components includes a plurality of raw material storage compartments (202), a material classification unit (204), a chemical dispersion unit (220), a material selection unit (210), a plurality of conveyer belts (not shown), and a blending unit (240) adapted for blending at least one of the raw materials (A, B, . . . N), at least one of the plurality of material sub-classes ($A_1$, $A_2$, $A_3$, ... $A_n$; $B_1$, $B_2$, $B_3$, ... $B_n$; $N_1$, $N_2$, $N_3$, ... $N_n$), at least one of the chemical material ($CM_1$, $CM_2$, $CM_3$, ... $CM_n$) as selected by the material selection unit (210) into a dry mix construction composition to be stored in a silo (270) for distribution.

In an aspect, as illustrated in FIG. 2 the raw materials (A, B, . . . N) from various sources are stored in respective raw material storage compartments (202). In an exemplary embodiment, the raw materials (A, B, . . . N) are fly ash (Material A), GGBS (Material B), and fine aggregate (Material N) such as sand, crushed sand, slag sand and the like. Further, the raw materials (A, B, . . . N) are stored in material handling compartments (260) as material sub-classes ($A_1$, $A_2$, $A_3$, ... $A_n$; $B_1$, $B_2$, $B_3$, ... $B_n$; $N_1$, $N_2$, $N_3$, ... $N_n$) as per their grades, particle size, physical state, source of raw material and the like. The raw materials (A, B, . . . N) are classified into material sub-classes ($A_1$, $A_2$, $A_3$, ... $A_n$; $B_1$, $B_2$, $B_3$, ... $B_n$; $N_1$, $N_2$, $N_3$, ... $N_n$) by the material classification unit (204).

Similarly, raw materials (other than raw material A, B, . . . N) which are course construction aggregates (Y and Z) and the like, are also stored separately in material handling compartments (260).

These material handling compartments (260) are controlled by the material selection unit (210). The material selection unit is responsible to control the discharge of at least one of the plurality of raw materials (A, B, . . . N), discharge of at least one of the plurality of material sub-classes ($A_1$, $A_2$, $A_3$, ... $A_n$; $B_1$, $B_2$, $B_3$, ... $B_n$; $N_1$, $N_2$, $N_3$, ... $N_n$), and discharge of at least one of the chemical material ($CM_1$, $CM_2$, $CM_3$, ... $CM_n$) as required to make construction material of a specific grade.

According to an embodiment of the present invention, the raw materials required for a specific grade of construction material are mixed in a blending unit (240). The blended mixture of specific grade of construction material is formed when at least one of the raw materials (A, B, . . . N), at least one of the plurality of material sub-classes ($A_1$, $A_2$, $A_3$, ... $A_n$; $B_1$, $B_2$, $B_3$, ... $B_n$; $N_1$, $N_2$, $N_3$, ... $N_n$), are blended along with at least one of the chemical materials ($CM_1$, $CM_2$, $CM_3$, ... $CM_n$). The chemical dispersion unit (220) has plurality of chemical materials ($CM_1$, $CM_2$, $CM_3$, ... $CM_n$), including but not limited to cellulosic material, starch material, lignosulphonate salt, stearate salt of alkali metal group or alkaline earth metal group, Sulphonated Naphthalene Formaldehyde, Poly Carboxylic Ether, hydroxide salt of alkali metal group or alkaline earth metal group and the like. The chemical materials ($CM_1$, $CM_2$, $CM_3$, ... $CM_n$) are selected based on the grade of construction material required to be manufactured, by the material selection unit (210).

In an exemplary embodiment, the system for producing DMC with improved structural properties employs the material selection unit (210) to control material classification unit (204), material holding compartments (260), chemical dispersion unit (220), blending unit (240), conveyors (not shown). That is, the material selection unit (210) uses automation to manufacture DMC with improved structural properties as per user/site requirements. The DMC formed after blending in the blending unit (240) is transferred to silo (270) for dispatching and/or storage.

In an aspect, the material selection unit (210) has a control panel and a command panel. The control panel is a processor implemented machine that serves as user interface (UI), and has a data storage device such as memory to store computer program and instructions/commands for the command panel.

In an implementation, the control panel of the material selection unit (210) receives user requirements. These user requirements are then analyzed by the processor using computer program installed thereon. The analysis concludes the type of construction material that is best suitable as per user requirements. Accordingly, various commands are sent to the command panel regarding the manufacture of said type of construction material.

In another implementation, the command panel is responsible to discharge of raw materials (A, B, . . . N) from raw material storage compartments (202), discharge of at least one of the plurality of material sub-classes ($A_1$, $A_2$, $A_3$, ... $A_n$; $B_1$, $B_2$, $B_3$, ... $B_n$; $N_1$, $N_2$, $N_3$, ... $N_n$) from material handling compartments (260), at least one of the chemical material ($CM_1$, $CM_2$, $CM_3$, ... $CM_n$) from the plurality of chemical storage units ($CS_1$, $CS_2$, $CS_3$, ... $CS_n$). Further, the command panel is also adapted to control the flow of the raw materials (A, B, . . . N), the plurality of material sub-classes ($A_1$, $A_2$, $A_3$, ... $A_n$; $B_1$, $B_2$, $B_3$, ... $B_n$; $N_1$, $N_2$, $N_3$, ... $N_n$), and chemical materials ($CM_1$, $CM_2$, $CM_3$, ... $CM_n$). Further, the command panel controls the blending unit (240), conveyors (not shown) and the silo (270) for dispatching/ storing the DMC.

In an aspect, the aggregates are dried through a drying system before the segregation/classification starts. For example, aggregates are dried before classification, or keeping the combined moisture to be <0.5% before blending occurs in the blending unit (240).

In yet another exemplary implementation, the commands from the command panel of the material selection unit (210) are generated by a human, or an expert in operating the said system. This allows the customization in cases where the human has the expertise to produce a better DMC than what would be produced by the program. In addition to that, it gives the human to override the commands generated by the UI of the material selection unit (210).

In an embodiment, the said material classification unit (204) is selected from at least a sieving unit, a cyclonic separator, or a combination thereof. The said material classification unit (204) is configured to provide the plurality of material sub-classes ($A_1, A_2, A_3, \ldots A_n; B_1, B_2, B_3, \ldots B_n; N_1, N_2, N_3, \ldots N_n$) based on a particle size grading of at least one of the said plurality of raw materials (A, B, ... N) stored in raw material storage compartments (202).

Figure 3:
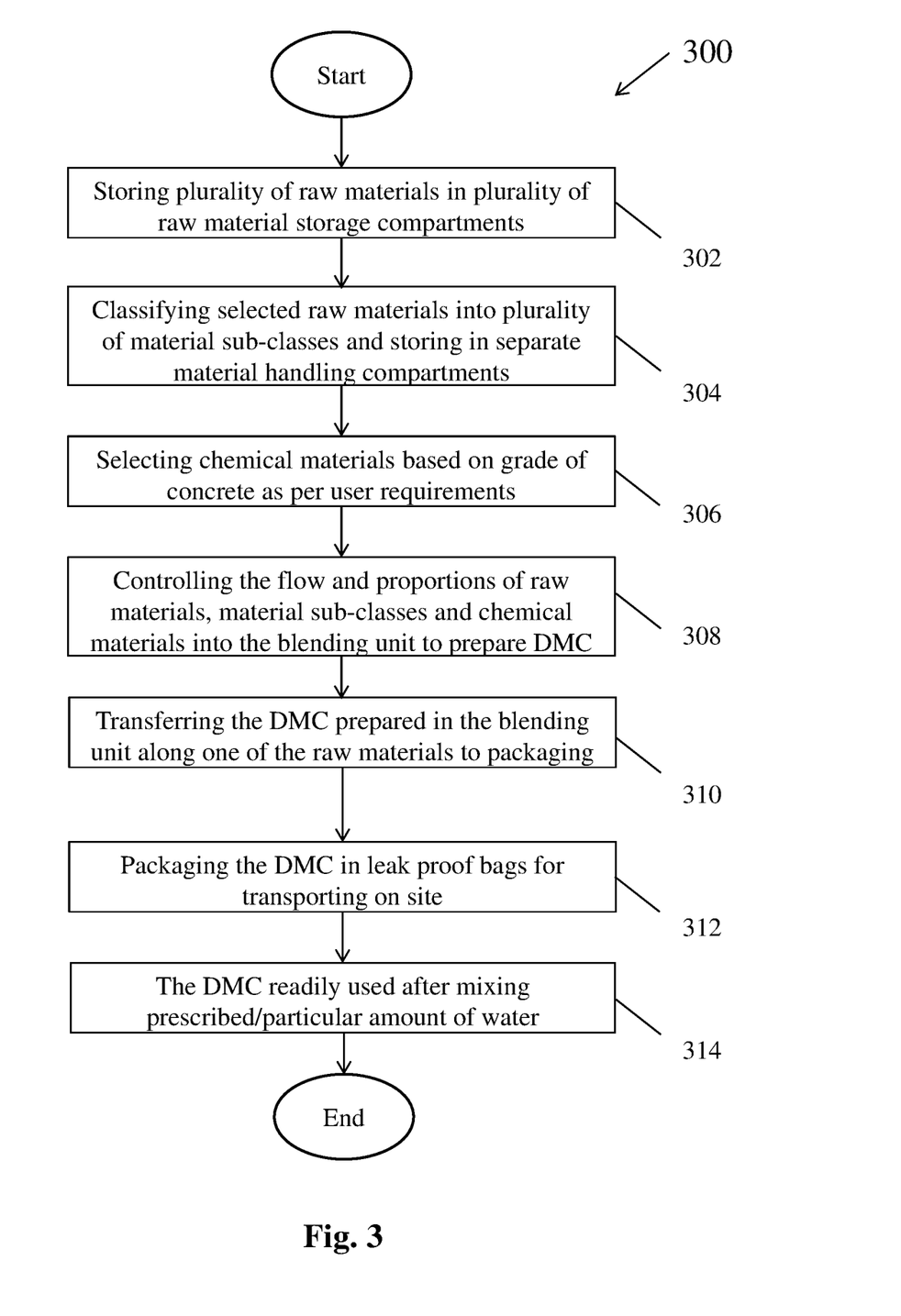
FIG. 3 illustrates an exemplary flowchart for the producing DMC, according to various embodiments of the present invention.

According to various embodiments of the present invention, as illustrated in FIG. 3, a process (300) for environment as in FIG. 1 for producing a dry mix construction material starts at step (302) where the material selection unit initiates the process (300) after sending command from its command panel. As disclosed above, the material selection unit has control panel which receives the user requirements and generates commands to produce appropriate grade of construction material. These commands are executed by the command panel that controls various units, compartments, of the system as described in description of FIG. 2.

The next step (304) involves the use of material selection unit which segregates the raw material (A, B, ... N) from the raw material storage compartment by grade, size, physical state, source and the like. The segregated material sub-classes ($A_1, A_2, A_3, \ldots A_n; B_1, B_2, B_3, \ldots B_n; N_1, N_2, N_3, \ldots N_n$) are stored in separate material handling compartments. In an implementation, the said material classification unit is selected from at least a sieving unit, a cyclonic separator, or a combination thereof.

In an embodiment, the chemical dispersion unit has a plurality of chemical materials ($CM_1, CM_2, CM_3, \ldots CM_n$) stored therein. The chemical materials ($CM_1, CM_2, CM_3, \ldots CM_n$) are selected from a cellulosic material, a starch material, a lignosulphonate salt, a stearate salt of alkali metal group or alkaline earth metal group, Sulphonated Naphthalene Formaldehyde, Poly Carboxylic Ether, a hydroxide salt of alkali metal group or alkaline earth metal group. At step (306) based on the required grade of construction material to be produced for user, the chemical material(s) ($CM_1, CM_2, CM_3, \ldots CM_n$) is/are selected.

At step (308), the command panel of the material selection unit controls the flow of raw materials (A, B, ... N) from the raw material storage compartments into to the blending unit. Further, the command panel also controls the flow of material sub-classes ($A_1, A_2, A_3, \ldots A_n; B_1, B_2, B_3, \ldots B_n; N_1, N_2, N_3, \ldots N_n$) from material handling compartments to the blending unit along with the flow of chemical materials ($CM_1, CM_2, CM_3, \ldots CM_n$) from the chemical dispersion unit. The blending unit then is responsible for blending the raw materials (A, B, ... N), the material sub-classes ($A_1, A_2, A_3, B_1, B_2, B_3, \ldots B_n; N_1, N_2, N_3, \ldots N_n$) and the chemical materials ($CM_1, CM_2, CM_3, \ldots CM_n$).

At step (310), the blended mixture of raw materials (A, B, ... N), material sub-classes ($A_1, A_2, A_3, \ldots A_n; B_1, B_2, B_3, \ldots B_n; N_1, N_2, N_3, \ldots N_n$), and chemical materials ($CM_1, CM_2, CM_3, \ldots CM_n$) which is now called as DMC is transferred from the blending unit into the silos for dispatch and/or storage.

At step (312), the produced DMC is packaged in leak proof bags and transported to the site. At step (314), the DMC is readily utilized after adding a particular amount of water prescribed on the bag.

The above process (300) is mere an exemplary embodiment to show the complete environment including gathering of user requirements, producing the DMC as per desired grade and utilization of such produced DMC at site.

In an embodiment of the present invention, the system and process for preparing DMC employs the material selection unit to select the grade of the construction material based on the user requirements. The material selection unit has a control panel that runs a program to identify the best grade of construction material as per user requirements. The control panel then generates commands for the command panel to execute in order to produce such DMC. The commands generated have plurality of construction material data sets.

In an exemplary embodiment, each of the said plurality of construction material data sets are selected from a weight percentage level of the plurality of material sub-classes ($A_1, A_2, A_3, \ldots A_n; B_1, B_2, B_3, \ldots B_n; N_1, N_2, N_3, \ldots N_n$), a weight percentage level of the plurality of raw materials (A, B, ... N), a weight percentage level of the chemical materials ($CM_1, CM_2, CM_3, \ldots CM_n$) or a combination thereof.

Figure 4:
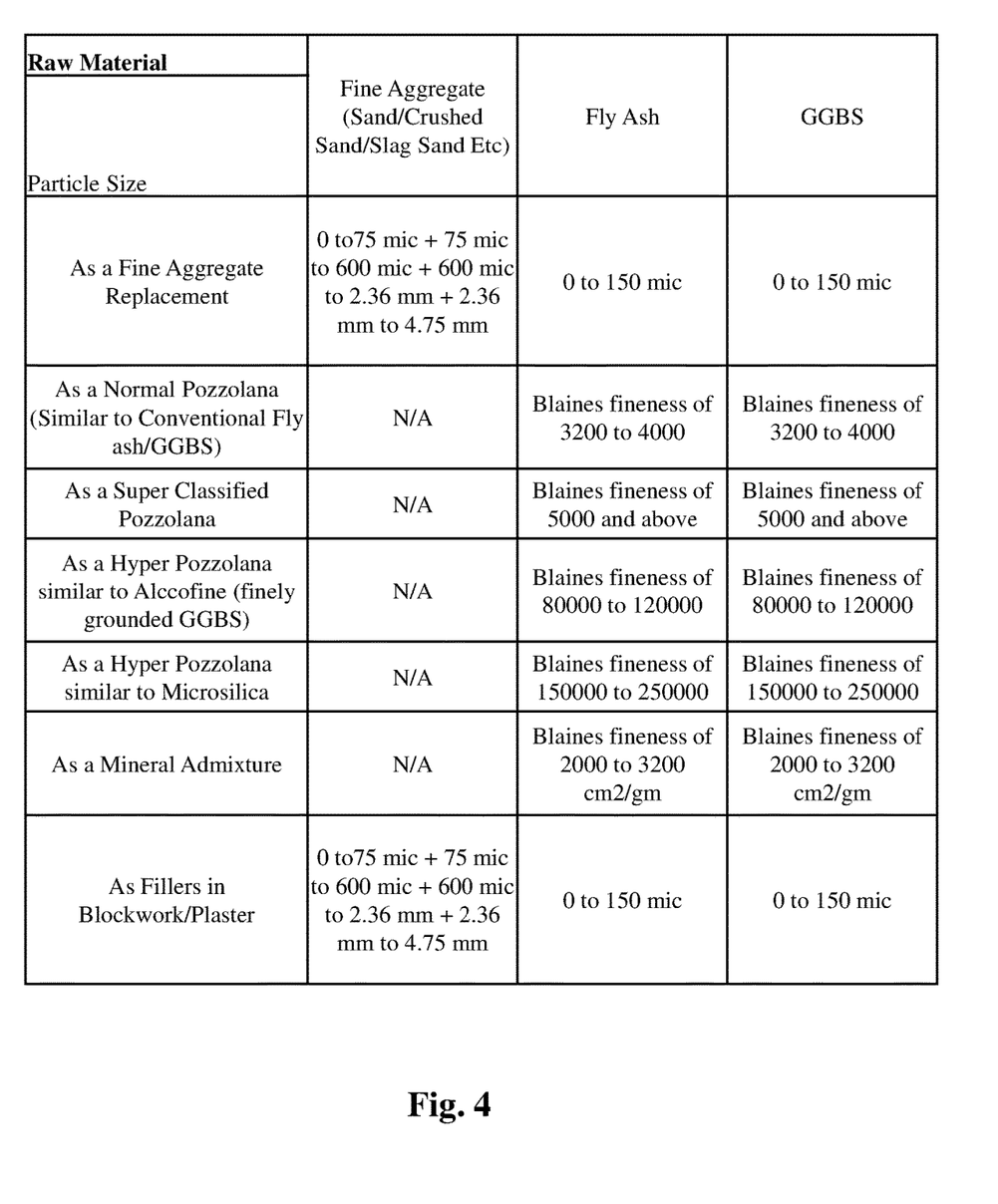
FIG. 4 illustrates an exemplary classification of raw materials (A, B, ... N) based on particle size, according to various embodiments of the present invention.
Figure 5:
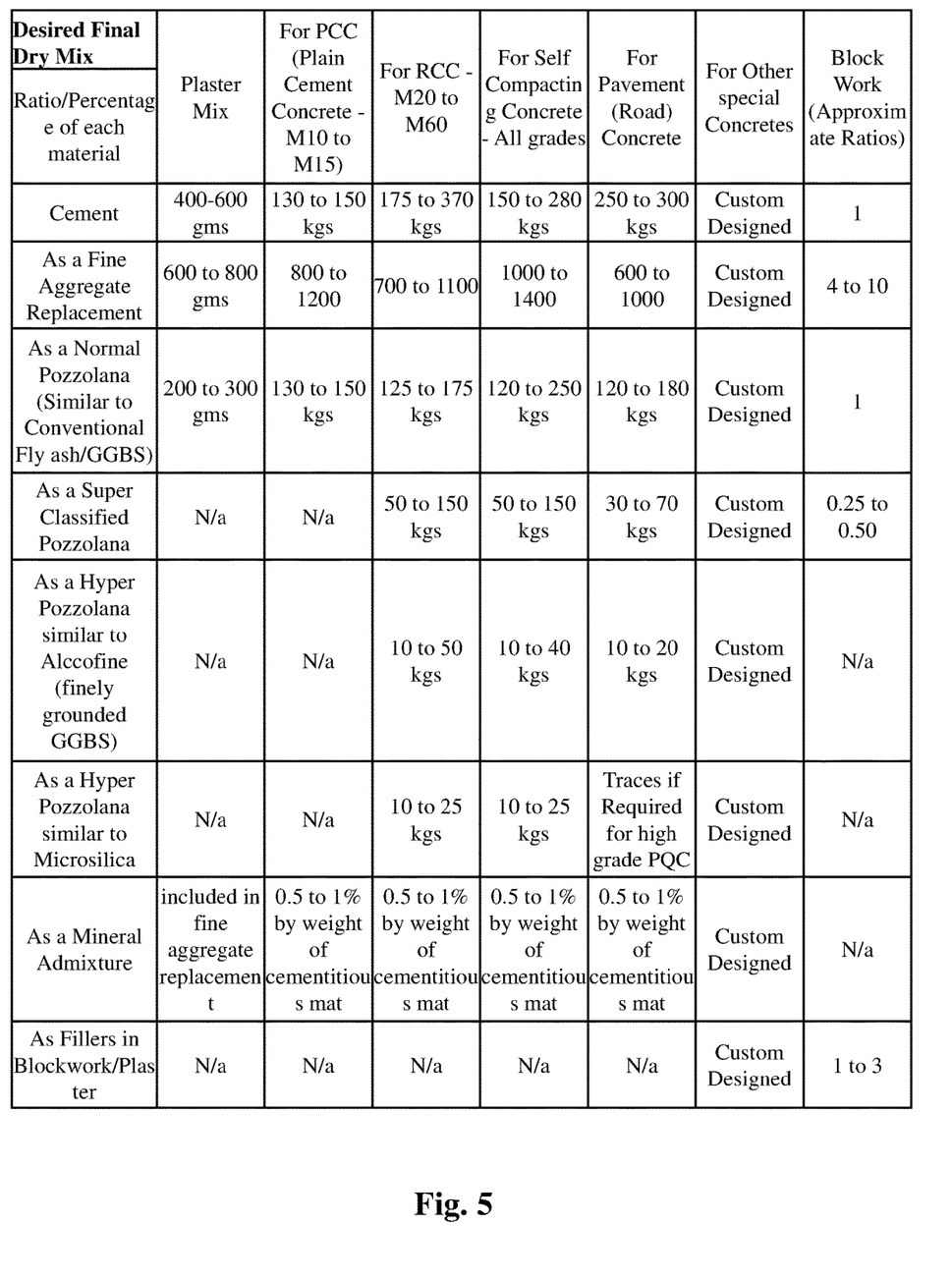
FIG. 5 illustrates exemplary grades of construction materials based on classification of different raw materials (A, B, ... N), according to various embodiments of the present invention.

According to an embodiment of the present invention, the data storage device of the material selection unit (210) comprises a plurality of construction material data sets as illustrated in FIG. 4, and each of the said plurality of construction material data sets correspond to a dry mix construction specification as illustrated in FIG. 5.

The construction material data sets as illustrated in FIG. 4, is an exemplary data set segregated based on particle size. This data set is used in producing the DMC of various grades such as plaster mix, plain cement construction, pavement construction and the like.

Various grades of construction are illustrated in FIG. 5. For example, if the requirement is for RCC—M20 to M60, refer the table in FIG. 5. The ingredients required are cement, fine aggregate replacement, pozzolona for imparting pozzolanic activity, mineral admixture etc. Now the proportions of the said ingredients involved are selected from the table as illustrated in FIG. 4.

According to an embodiment, the system and process of the present invention employs a material selection unit that has a computing program along with a processor that is adapted to compare the construction specification as inputted by the user with at least one construction material data set (FIG. 5), and generates the plurality of commands as per the at least one construction material data set. Further, in another embodiment, the said computing program along with a processor is also replaced by an expert manual interface. The said expert manual interface provides an easy means to a user to compare the construction specification as required with at least one construction material data set. Hence, the system and process of the present invention provides an automated as well as a manual interface to compare the user required construction specification with at least one construction material data set.

In yet another embodiment, the said plurality of commands are selected from a name and weight percentage level of at least one of the plurality of raw materials (A, B, ... N), a name and weight percentage level of at least one of the plurality of material sub-classes ($A_1, A_2, A_3, \ldots A_n; B_1, B_2, B_3, \ldots B_n; N_1, N_2, N_3, \ldots N_n$), a name and weight percentage level of at least one of the chemical materials ($CM_1, CM_2, CM_3, \ldots CM_n$) or a combination thereof.

In an aspect, the said plurality of commands provides a plurality of dropping over a plurality of conveyer belts and/or alternate dispersion systems, wherein the said plurality of dropping are selected from at least a dropping of one of the plurality of raw materials (A, B, ... N), at least a dropping of one of the plurality of material sub-classes ($A_1, A_2, A_3, \ldots A_n; B_1, B_2, B_3, \ldots B_n; N_1, N_2, N_3, \ldots N_n$), or at least a dropping of one of the chemical materials (CM$_1$, CM$_2$, CM$_3$, . . . CM$_n$) over the said plurality of conveyer belts.

The system and process for producing DMC with improved structural properties utilizes material selection unit with command panel to control the components involved and process of the present invention. The command panel controls the flow/droppings of at least a dropping of one of the plurality of raw materials (A, B, . . . N) from the raw material storage compartments, at least a dropping of one of the plurality of material sub-classes (A$_1$, A$_2$, A$_3$, . . . A$_n$; B$_1$, B$_2$, B$_3$, . . . B$_n$; N$_1$, N$_2$, N$_3$, . . . N$_n$) from the material handling compartments, and/or at least a dropping of one of the chemical materials (CM$_1$, CM$_2$, CM$_3$, . . . CM$_n$) form the chemical dispersion unit. The said plurality of droppings is then blended in a blending unit and the dry mix construction material is produced.

Figure 6:
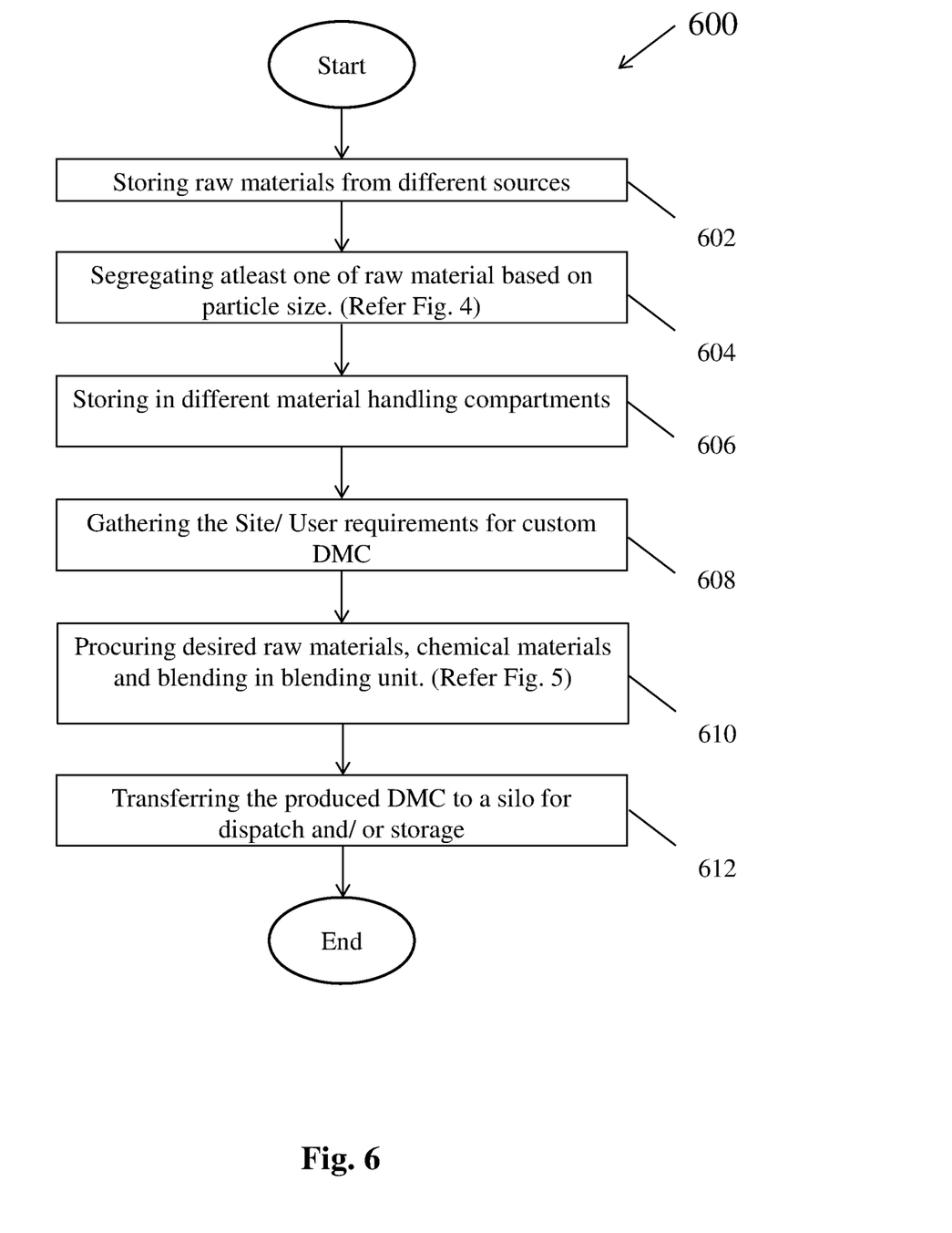
FIG. 6 illustrates an exemplary process wherein the DMC is produced based on user requirements, according to various embodiments of the present invention.

According to an embodiment of the present invention, the process as illustrated in FIG. 6 illustrates the exemplary working of components of FIG. 2. The process starts at (602) where the plurality of raw materials (A, B, . . . N) is stored in plurality of raw material storage compartments from different sources.

The next step (604) involves the use of material classification unit that classifies or segregates at least one of the raw materials (A, B, . . . N) based on particle size as illustrated in FIG. 4.

The segregated raw materials along with non-segregated raw materials are stored separately in material handling compartments in step (606).

According to various embodiments, the process (600) is controlled by the material selection unit. Wherein, the material selection unit has a control panel including UI that is configured to receive user requirements. Further, control panel has a computer program that identifies particular grade of construction material based on the user requirements from a data storage device. The data storage device has various raw materials based on particle size (as in FIG. 4), this data is utilized to generate commands for the production of DMC that is user's requirement specific.

The step (608) describes how the user requirements are gathered including by inputting site area, or place (floor, wall, roof), or custom requirements etc. These requirements are gathered through UI of the control panel of the material selection unit.

A command panel of the material selection unit is responsible for executing the various commands generated by the control panel related to grade of DMC to be produced according to user requirements. The command panel controls the flow of raw materials (A, B, . . . N), material sub-classes (A$_1$, A$_2$, A$_3$, . . . A$_n$; B$_1$, B$_2$, B$_3$, . . . B$_n$; N$_1$, N$_2$, N$_3$, NO, chemical materials (CM$_1$, CM$_2$, CM$_3$, . . . CM$_n$) and working of blending unit, conveyors etc. of present system. Therefore, step (610), the command panel procures different raw materials (A, B, . . . N), material sub-classes (A$_1$, A$_2$, A$_3$, . . . A$_n$; B$_1$, B$_2$, B$_3$, . . . B$_n$; N$_1$, N$_2$, N$_3$, . . . N$_n$) and/or chemical materials (CM$_1$, CM$_2$, CM$_3$, . . . CM$_n$) and blends them in the blending unit to produce DMC as per user requirements.

The produced DMC is then transferred to silo at step (612) where it is dispatched in bags to the site or stored for further use.

In an exemplary implementation, say a user requires "plaster mix" at his site. The present system and process of producing DMC provides the user with said construction material of improved structural properties (refer FIGS. 2 and 6). Different raw materials (A, B, . . . N) in the storage compartments (202) are classified and stored in material handling compartments (260). Few raw materials (A, B, . . . N) are classified by material classification unit (204). Since, the user requires "plaster mix" as final product, the said DMC is input through the control panel of material selection unit (210).

The control panel has a computer program stored therein which selects a particular construction material data set from a data storage device. Corresponding to the construction material data set selected, the control panel generates commands and sends them to command panel of material selection unit (210). Since, the command panel controls various components of the system as disclosed in FIG. 2, it selects the raw materials (A, B, . . . N), the material sub-classes (A$_1$, A$_2$, A$_3$, . . . A$_n$; B$_1$, B$_2$, B$_3$, . . . B$_n$; N$_1$, N$_2$, N$_3$, . . . N$_n$) and/or chemical materials (CM$_1$, CM$_2$, CM$_3$, . . . CM$_n$) as required for the production of "plaster mix". Further, in another embodiment, the said control panel along with the said computing program is also replaced by an expert manual interface. The said expert manual interface provides an easy means to a user to compare the construction specification as required with at least one construction material data set.

(Refer FIG. 5) For every 400-600 grams of cement, 600-800 grams of fine aggregate replacement, 200-300 grams of normal pozzolana (similar to flyash/GGBS) is required to make "plaster mix". (Now refer FIG. 4) Also, to produce fine aggregate replacement, fine aggregate of (0 to 75 mic+75 mic to 600 mic+600 mic to 2.36 mm+2.36 mm to 4.75 mm), fly ash of (0 to 150 mic) and GGBS of (0 to 150 mic) size is procured from respective material handling compartments (260). Similarly, for normal pozzolana, fly ash and GGBS of Blaines fineness of 3200 to 4000 each is procured from material handling compartments (260).

As disclosed in FIG. 2, the material sub-classes (A$_1$, A$_2$, A$_3$, . . . A$_n$; B$_1$, B$_2$, B$_3$, . . . B$_n$; N$_1$, N$_2$, N$_3$, . . . N$_n$), and/or chemical materials (CM$_1$, CM$_2$, CM$_3$, . . . CM$_n$) are transferred in the blending unit (240) with conveyors (not shown). The blending unit (240) blends at least one of the plurality of material sub-classes (A$_1$, A$_2$, A$_3$, . . . A$_n$; B$_1$, B$_2$, B$_3$, . . . B$_n$; N$_1$, N$_2$, N$_3$, . . . N$_n$) and/or chemical materials (CM$_1$, CM$_2$, CM$_3$, . . . CM$_n$) as selected by the commands of the command panel of material selection unit (210) and transports the produced DMC (plaster mix) to the silo (270).

Based on the requirements of the user, the produced DMC is packet in bags of different volumes and shipped to site where they can be readily utilized after adding particular amount of water thereto.

The same process is repeated for RCC, pavement construction material and other DMC by different commands generated by control panel and controlled by command panel of material selection unit.

Figure 7:
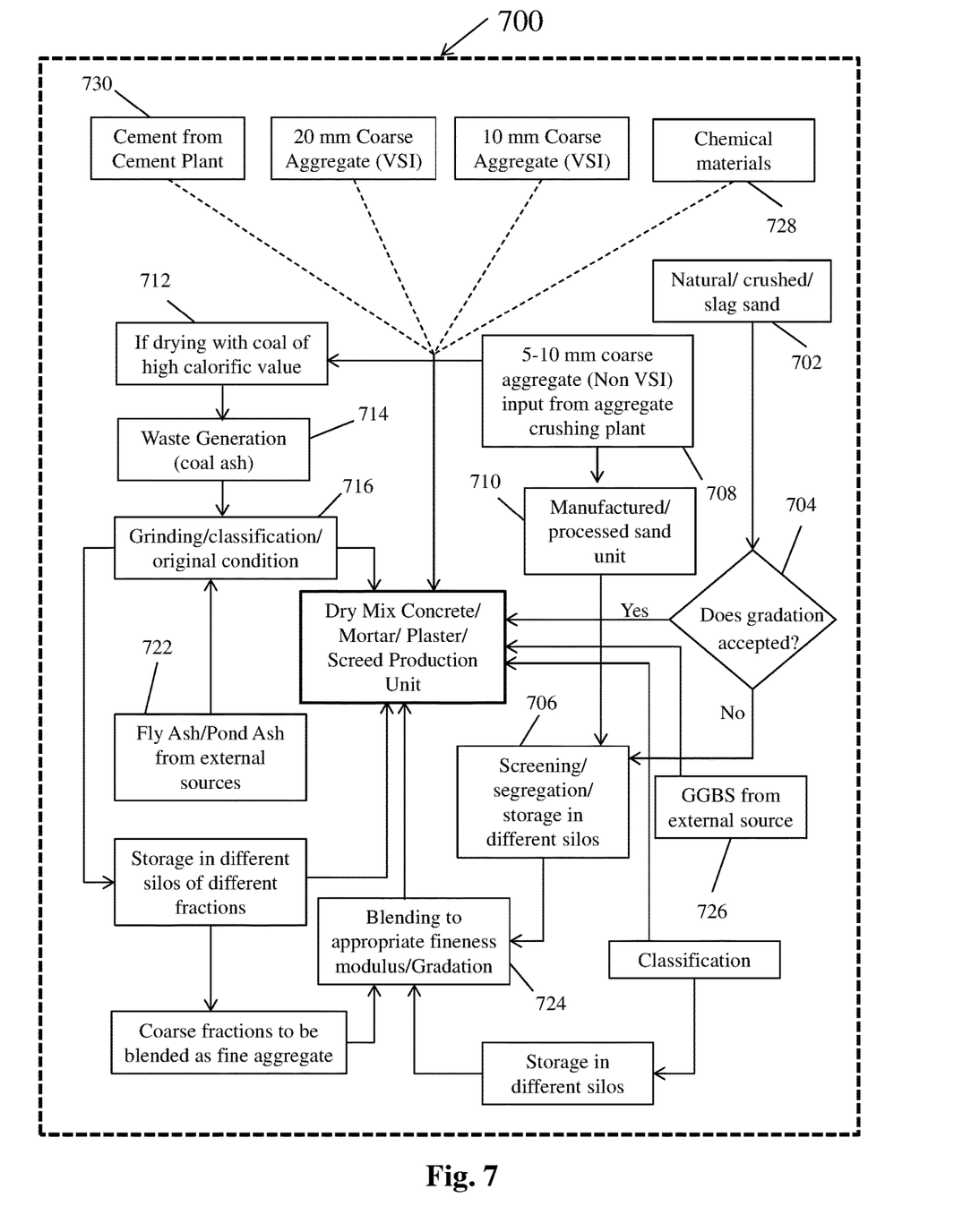
FIG. 7 illustrates raw material (A, B, ... N) process management block diagram for producing the DMC by utilizing conventional and industrial waste raw materials.

In an exemplary embodiment of the present invention, FIG. 7 illustrates step by step flow 700 for the raw material process management block diagram as disclosed earlier in FIG. 6:

i. Natural river sand (702), if abundantly available in the particular region and if the fineness modulus and gradation are perfectly matching the desired requirement, then such natural sand is directly used as a fine aggregate for production of construction materials. In case of absence of natural river sand, crushed stone sand or Iron slag sand (702) is used as either total or partial replacement of fine aggregate, provided the fineness modulus (FM) and gradation are matching the desired requirement (refer FIG. 4 for requirements);

ii. In case the above two parameters are not matching the requirements (704), the fine aggregate is diverted to a screening plant and stored in separate sand silos (706) containing different fractions to be blended later by automated processes to acquire almost the exact FM and gradation, and further to be used for construction material production;

iii. Coarse aggregate of 5-10 mm (non-VSI material) size is the fraction that is abundantly available in any crushers (708) for which the consumption and/or production ratio is very low as compared to other size fraction aggregates, such as 20 mm down aggregates;

iv. In case a sand manufacturing/processing unit (710) is strategically planned to be adopted as functionality, this fraction of 5-10 mm aggregate may be used as a raw material (A, B, . . . N) for producing the processed sand;

v. The processed sand is then diverted to a screening unit (706), which is then stored in different silos, later to be blended in appropriate proportions (724) to achieve the desired properties for construction material production of various natures and requirements. This is a customized process forming an integral part of the step by step flow 700 illustrated in FIG. 7. This becomes the primary output of the sand processing unit (710).

It is also evident that a maximum datum level of moisture content has to be determined and/or set for the production of dry construction materials. Specifically, the said datum level of moisture contents for the production of dry construction materials is set to a maximum level of 0.5%. Further, it is most preferred to bring down the moisture content of raw materials to the moisture datum level as set for the final dry construction materials. For instance, if the moisture datum level for the is frozen as to a maximum level of 0.5%, then the raw materials or aggregates (i.e. fine aggregate in particular) have to be dried in a pre-designed dryer to bring down the moisture level to 0.5%.

Further, it is most preferred to maintain a closed/semi-closed environment during the production of the dry construction materials so that there is no extra increase in the moisture level during the entire production process. Accordingly, the present system provides a closed/semi-closed environment with a defined time dependent packing strategy for producing a desired construction material. The said closed/semi-closed environment with said time dependent packing strategy ensures that there is no extra increase in the moisture level of the dry mixed construction materials.

In an embodiment, an efficient fuel which is techno-commercially viable has to be utilized to operate the said pre-designed dryer. Kerosene or other petrochemical liquid fuels is not found to be commercially viable, also due to its comparatively lower calorific value.

After careful consideration and commercial analysis, if coal of very high calorific value is used as raw fuel for operating the said pre-designed dryer then such coal combustion will also produce a high quality of coal ash.

vi. This coal ash (714) from coal of very high calorific value (712) is analyzed for its mechanical and chemical properties for the feasibility of using it as a cement or sand replacement.

vii. If found that in its original condition, the coal ash satisfies the relevant standards and qualifies as a cement replacement, it is directly pumped into fly ash silos to be used as a cement replacement.

viii. If found that it requires some alteration in its properties, the coal ash may be diverted to a grinding/classification unit (716), which segregates the ash into coarser and finer fractions.

ix. The coarser fractions, are directly diverted to sand silos of different fractions, hence used later by blending in appropriate proportions (724) to acquire the desired properties of fine aggregates to produce construction material.

x. The finer fractions, are diverted towards fly ash silos, to be used as a cement replacement for production of construction material.

xi. Fly ash from an external source (722) may also be subjected to the same processes as described through steps i-x.

xii. If Ground Granulated Blast Furnace Slag or GGBFS (726) is chosen instead of fly ash, then as illustrated in the step by step flow 700 of FIG. 7, GGBFS may undergo the same process as explained through steps i-x.

xiii. Cement (730), is appropriately chosen based on its established quality parameters, basically the strength, geographical availability, reputation of the company as well as the particular technical requirement of the jobs considered.

xiv. VSI aggregate below 10 mm size, 20 mm coarse aggregates, admixtures (in powder form) is blended along with processed fine aggregate as well as processed cementitious materials in the appropriate proportions as per the standard mix designs, hence ensuring optimum quality of construction material being produced. It is made sure that the shape of the aggregates chosen is well acceptable.

xv. Admixtures (728) are almost always in powder form. They are stored in separate bins which are dispersed through appropriately designed dry dispensers into the central mixer, through an advanced mechanically designed system.

xvi. The step by step flow 700 as illustrated in FIG. 7 therefore produces a dry mix construction material/mortar/plaster/screed based on the parameters best for user requirements.

The foregoing descriptions of specific embodiments of the present invention have been presented for purposes of description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

I claim:

1. A system for producing dry mix construction materials with improved engineering properties, the system comprises:

a plurality of raw material storage compartments adapted for storing a plurality of raw materials (A, B, . . . , N);

a material classification unit configured to classify at least one of the said plurality of raw materials (A, B, . . . , N) into a plurality of material sub-classes ($A_1$, $A_2$, $A_3$, . . . $A_n$; $B_1$, $B_2$, $B_3$, . . . $B_n$; . . . ; $N_1$, $N_2$, $N_3$, . . . $N_n$), wherein the said plurality of material sub-classes ($A_1$, $A_2$, $A_3$, . . . $A_n$; $B_1$, $B_2$, $B_3$, . . . $B_n$; . . . ; $N_1$, $N_2$, $N_3, \ldots N_n$), as classified by the material classification unit, are stored in a plurality of material handling compartments;

a chemical dispersion unit having a plurality of chemical materials ($CM_1, CM_2, CM_3, \ldots, CM_n$) stored in a plurality of chemical storage units ($CS_1, CS_2, CS_3, \ldots, CS_n$);

a material selection unit working conjunction with the plurality of material handling compartments, said plurality of raw material storage compartments, and said plurality of chemical storage units ($CS_1, CS_2, CS_3, \ldots, CS_n$), wherein the said material selection unit is configured to select at least one material sub-class ($A_1, A_2, A_3, \ldots A_n; B_1, B_2, B_3, \ldots B_n; \ldots; N_1, N_2, N_3, \ldots N_n$), as classified by the material classification unit, at least one raw material (A, B, . . . , N), and at least one chemical material ($CM_1, CM_2, CM_3, \ldots, CM_n$) as per a construction material grade provided by a user;

a plurality of conveying systems connecting at least one of the said plurality of material handling compartments, the said raw material storage compartments and the said plurality of chemical storage units ($CS_1, CS_2, CS_3, \ldots, CS_n$) with a blending unit, wherein the said blending unit is adapted to blend the said at least one selected material sub-class ($A_1, A_2, A_3, \ldots A_n; B_1, B_2, B_3, \ldots B_n; \ldots; N_1, N_2, N_3, \ldots N_n$), the at least one selected raw material (A, B, . . . , N) and at least one chemical material ($CM_1, CM_2, CM_3, \ldots, CM_n$) to produce a dry mix construction material blend;

wherein the said material selection unit comprises:
a control panel having a user interface, a data storage unit, a computing program and a processor, wherein the said control panel is adapted to generate a plurality of commands as per the construction material grade provided by the user, the said data storage unit comprising a plurality of construction material data sets, wherein each of the said plurality of construction material data sets correspond to one of a concrete material specification, an ancillary concrete material specification, an ancillary cement material specification, a saw dust material specification, or a mud material specification; and a command panel for executing the said plurality of commands on the said plurality of raw material storage compartments, the said plurality of material handling compartments, and the said plurality of chemical storage units ($CS_1, CS_2, CS_3, \ldots, CS_n$); and wherein each of the said plurality of construction material data sets are selected from a weight percentage ratio of at least one of the plurality of raw materials (A, B, . . . N), a weight percentage ratio of at least one of the plurality of material sub-classes ($A_1, A_2, A_3, \ldots A_n; B_1, B_2, B_3, \ldots B_n; \ldots; N_1, N_2, N_3, \ldots N_n$), a weight percentage ratio of at least one of the plurality of chemical materials ($CM_1, CM_2, CM_3, \ldots, CM_n$) or a combination thereof.

2. The system as claimed in claim 1, wherein the said material classification unit is selected from at least a sieving unit, a vibratory/rotary ball mill, an air classification system, a crushing and screening unit or a combination thereof.

3. The system as claimed in claim 1, wherein the said material classification unit is configured to provide the plurality of material sub-classes ($A_1, A_2, A_3, \ldots A_n; B_1, B_2, B_3, \ldots B_n; \ldots; N_1, N_2, N_3, \ldots N_n$) based on a particle size and/or particle shape grading of each of the said plurality of raw materials.

4. The system as claimed in claim 1, wherein the said plurality of chemical materials are selected from at least one of a cellulosic material, a starch material, a lignosulphonate salt, a stearate salt of alkali metal group or alkaline earth metal group, Sulphonated Naphthalene Formaldehyde, Poly Carboxylic Ether, an additive composition, a hydroxide salt of alkali metal group, an alkaline earth metal group, or a combination thereof.

5. The system as claimed in claim 1, wherein the said user interface provides an input panel to the user to input the construction material grade.

6. The system as claimed in claim 1, further comprises an impurity and moisture removal unit integrated in line with the said plurality of raw material storage compartments, wherein the said impurity and moisture removal unit is adapted to make the said plurality of raw materials dust and moisture free.

7. A system for producing dry mix materials with improved engineering properties, the system comprising:
a plurality of raw material storage compartments adapted for storing a plurality of raw materials (A, B, . . . , N);

a material classification unit configured to classify at least one of the said plurality of raw materials (A, B, . . . , N) into a plurality of material sub-classes (A1, A2, A3, . . . An; B1, B2, B3, . . . Bn; . . . ; N1, N2, N3, . . . Nn), wherein the said plurality of material sub-classes (A1, A2, A3, . . . An; B1, B2, B3, . . . Bn; . . . ; N1, N2, N3, . . . Nn), as classified by the material classification unit, are stored in a plurality of material handling compartments;

a chemical dispersion unit having a plurality of chemical materials (CM1, CM2, CM3, . . . , CMn) stored in a plurality of chemical storage units (CS1, CS2, CS3, . . . , CSn);

a material selection unit working in conjunction with the plurality of material handling compartments, said plurality of raw material storage compartments, and said plurality of chemical storage units (CS1, CS2, CS3, . . . , CSn), wherein the said material selection unit is configured to select at least one material sub-class (A1, A2, A3, . . . An; B1, B2, B3, . . . Bn; . . . ; N1, N2, N3, . . . Nn), as classified by the material classification unit, at least one raw material (A, B, . . . , N), and at least one chemical material (CM1, CM2, CM3, . . . , CMn) as per a construction material grade provided by a user;

a plurality of conveying systems connecting at least one of the said plurality of material handling compartments, the said raw material storage compartments and the said plurality of chemical storage units (CS1, CS2, CS3, . . . , CSn) with a blending unit, wherein the said blending unit is adapted to blend the said at least one selected material sub-class (A1, A2, A3, . . . An; B1, B2, B3, . . . Bn; . . . ; N1, N2, N3, . . . Nn), the at least one selected raw material (A, B, . . . , N) and at least one chemical material (CM1, CM2, CM3, . . . , CMn) to produce a dry mix construction material blend;

wherein the said material selection unit comprises:
a control panel having a user interface, a data storage unit, a computing program and a processor, wherein the said control panel is adapted to generate a plurality of commands as per the construction material grade provided by the user, the said data storage unit comprises a plurality of construction material data sets, each of the said plurality of construction material data sets correspond to one of a concrete material specification, an ancillary concrete material specification, an ancillary cement material specification, a saw dust material specification, or a mud material specification, the said computing program along with the said processor being adapted to compare the construction material grade as inputted by the user to at least one construction material data set, and to generate the plurality of commands as per the at least one construction material data set matching with the inputted construction material grade; and a command panel for executing the said plurality of commands on the said plurality of raw material storage compartments, the said plurality of material handling compartments, and the said plurality of chemical storage units ($CS_1$, $CS_2$, $CS_3$, ... $CS_n$).

8. The system as claimed in claim 7, wherein the said plurality of commands are communicated to the command panel to execute the said plurality of commands on the said plurality of raw material storage compartments, the said plurality of material handling compartments, the said plurality of chemical storage units ($CS_1$, $CS_2$, $CS_3$, ..., $CS_n$).

9. The system as claimed in claim 8, wherein the said plurality of commands are selected from a name and weight percentage level of at least one of the plurality of raw materials (A, B, ..., N), a name and weight percentage level of at least one of the plurality of material sub-classes ($A_1$, $A_2$, $A_3$, ... $A_n$; $B_1$, $B_2$, $B_3$, $B_n$; ... ; $N_1$, $N_2$, $N_3$, ... $N_n$), a name and weight percentage level of at least one of the plurality of chemical materials or a combination thereof.

10. The system as claimed in claim 9, wherein the said plurality of commands provides a plurality of droppings over the said plurality of conveying systems, wherein the said plurality of droppings are selected from at least a dropping of one of the plurality of raw materials (A, B, ..., N), at least a dropping of one of the plurality of material sub-classes ($A_1$, $A_2$, $A_3$, ... $A_n$; $B_1$, $B_2$, $B_3$, ... $B_n$; ... ; $N_1$, $N_2$, $N_3$, ... $N_n$), or at least a dropping of one of the plurality of chemical materials ($CM_1$, $CM_2$, $CM_3$, ..., $CM_n$).

11. The system as claimed in claim 10, wherein the said plurality of droppings are blended in the said blending unit to produce the dry mix construction material blend.

12. A process for producing a dry mix construction materials with improved engineering properties, wherein the said process comprises:

selection and storage of a plurality of raw materials (A, B, ..., N) into a plurality of raw material storage compartments;

classification of at least one of the said plurality of raw materials via a material classification unit into a plurality of material sub-classes ($A_1$, $A_2$, $A_3$, $A_n$; $B_1$, $B_2$, $B_3$, $B_n$; $N_1$, $N_2$, $N_3$, $N_n$), wherein the said plurality of material sub-classes ($A_1$, $A_2$, $A_3$, $A_n$; $B_1$, $B_2$, $B_3$, $B_n$; $N_1$, $N_2$, $N_3$, $N_n$) as classified are stored in a plurality of material handling compartments;

selection and storage of a plurality of chemical materials ($CM_1$, $CM_2$, $CM_3$, $CM_n$) into a plurality of chemical storage units ($CS_1$, $CS_2$, $CS_3$, $CS_n$), wherein the plurality of chemical storage units ($CS_1$, $CS_2$, $CS_3$, $C_{Sn}$) are connected with a chemical dispersion unit;

selection of at least one raw material (A, B, N), at least one material sub-class (Ai, A2, A3, An; Bi, B2, B3, Bn; Ni, N2, N3, Nn), and at least one chemical material (CMi, CM2, CM3, CMn), wherein the said selection is completed as per a construction material grade provided by a user to a material selection unit having a control panel and a command panel working in conjunction with the said plurality of raw material storage compartments, said plurality of material handling compartments, and said plurality of chemical storage units ($CS_1$, $CS_2$, $CS_3$, $CS_n$), wherein the said control panel comprises:

a user interface, wherein the user enters the construction material grade to the control panel via the said user interface;

a data storage unit having a plurality of construction material data sets, wherein each of the said plurality of construction material data sets correspond to one of a construction material specification, an ancillary construction material specification, an ancillary cement material specification, a saw dust material specification, or a mud material specification; and a computing program and a processor adapted to compare the construction material grade as inputted by the user to at least one construction material data set, wherein the said processor generates the plurality of commands as per the at least one construction material data set matching with the inputted construction material grade, the said plurality of commands being communicated to the command panel; and blending the said at least one selected raw material (A, B, N), at least one selected material sub-class (Ai, A2, A3, An; Bi, B2, B3, Bn; Ni, N2, N3, Nn), and at least one chemical material (CMi, CM2, CM3, CMn) via a blending unit to produce the dry mix construction material blend.

13. The process as claimed in claim 12, wherein the classification of at least one of the said plurality of raw materials (A, B, N) is based on a particle size and/or particle shape grading of each of the said plurality of raw materials (A, B, N).

14. The process as claimed in claim 12, wherein the said material classification unit is selected from at least a sieving unit, a vibratory/rotary ball mill, an air classification system, a crushing and screening unit or a combination thereof.

15. The process as claimed in claim 12, wherein the said plurality of chemical materials (CMi, CM2, CM3, CMn) are selected from at least one of a cellulosic material, a starch material, a lignosulphonate salt, a stearate salt of alkali metal group or alkaline earth metal group, Sulphonated Naphthalene Formaldehyde, Poly Carboxylic Ether, an additive composition, a hydroxide salt of alkali metal group, an alkaline earth metal group, or a combination thereof.

16. The process as claimed in claim 12, wherein each of the said plurality of construction material data sets are selected from a weight percentage ratio of at least one of the plurality of raw materials (A, B, N), a weight percentage ratio of at least one of the plurality of material sub-classes (Ai, A2, A3, An; Bi, B2, B3, Bn; Ni, N2, N3, Nn), a weight percentage ratio of at least one of the plurality of chemical materials (CMi, CM2, CM3, CMn), or a combination thereof.

* * * * *